(12) United States Patent
Baechle et al.

(10) Patent No.: US 8,651,587 B2
(45) Date of Patent: Feb. 18, 2014

(54) ELECTRONICALLY CONTROLLED HYDRAULIC BRAKE SYSTEM

(75) Inventors: Martin Baechle, Frankfurt (DE); James John Rizzo, Macomb, MI (US); Yuji Nakayasu, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 328 days.

(21) Appl. No.: 13/044,814

(22) Filed: Mar. 10, 2011

(65) Prior Publication Data

US 2012/0228925 A1 Sep. 13, 2012

(51) Int. Cl.
*B60T 13/16* (2006.01)
(52) U.S. Cl.
USPC .............. 303/10; 303/116.1; 303/119.2
(58) Field of Classification Search
USPC ......... 303/10, 113.3, 116.1, 116.2, 20, 119.1, 303/119.2, DIG. 11
See application file for complete search history.

(56) References Cited

U.S. PATENT DOCUMENTS

| 5,275,476 A | 1/1994 | Maisch |
| 5,383,718 A | 1/1995 | Burgdorf et al. |
| 5,927,828 A * | 7/1999 | Beck .................. 303/116.2 |
| 7,837,280 B2 * | 11/2010 | Okano et al. ............ 303/113.5 |
| 2004/0201273 A1 | 10/2004 | Kamiya et al. |
| 2010/0084914 A1 * | 4/2010 | Hatano et al. ............ 303/113.5 |

FOREIGN PATENT DOCUMENTS

| JP | 20100089626 A | 4/2010 |
| WO | 2012103193 A1 | 8/2012 |

OTHER PUBLICATIONS

PCT/US2012/26860 International Search Report and The Written Opinion of the International Searching Authority.

* cited by examiner

*Primary Examiner* — Pamela Rodriguez

(57) ABSTRACT

A hydraulic brake system equipped for anti-slip control and for active brake interventions has a self-priming pump. A pressure retention valve prevents the brake system's low-pressure accumulator and the wheel brakes from being evacuated below atmospheric pressure during a sensitive brake operation. A two-position valve deactivates the bias of the pressure retention valve by opening a fluid path from the low-pressure accumulator to the pump when it is desired that the wheel brakes be retracted farther to reduce drag and excessive wear of the brake friction elements.

17 Claims, 3 Drawing Sheets

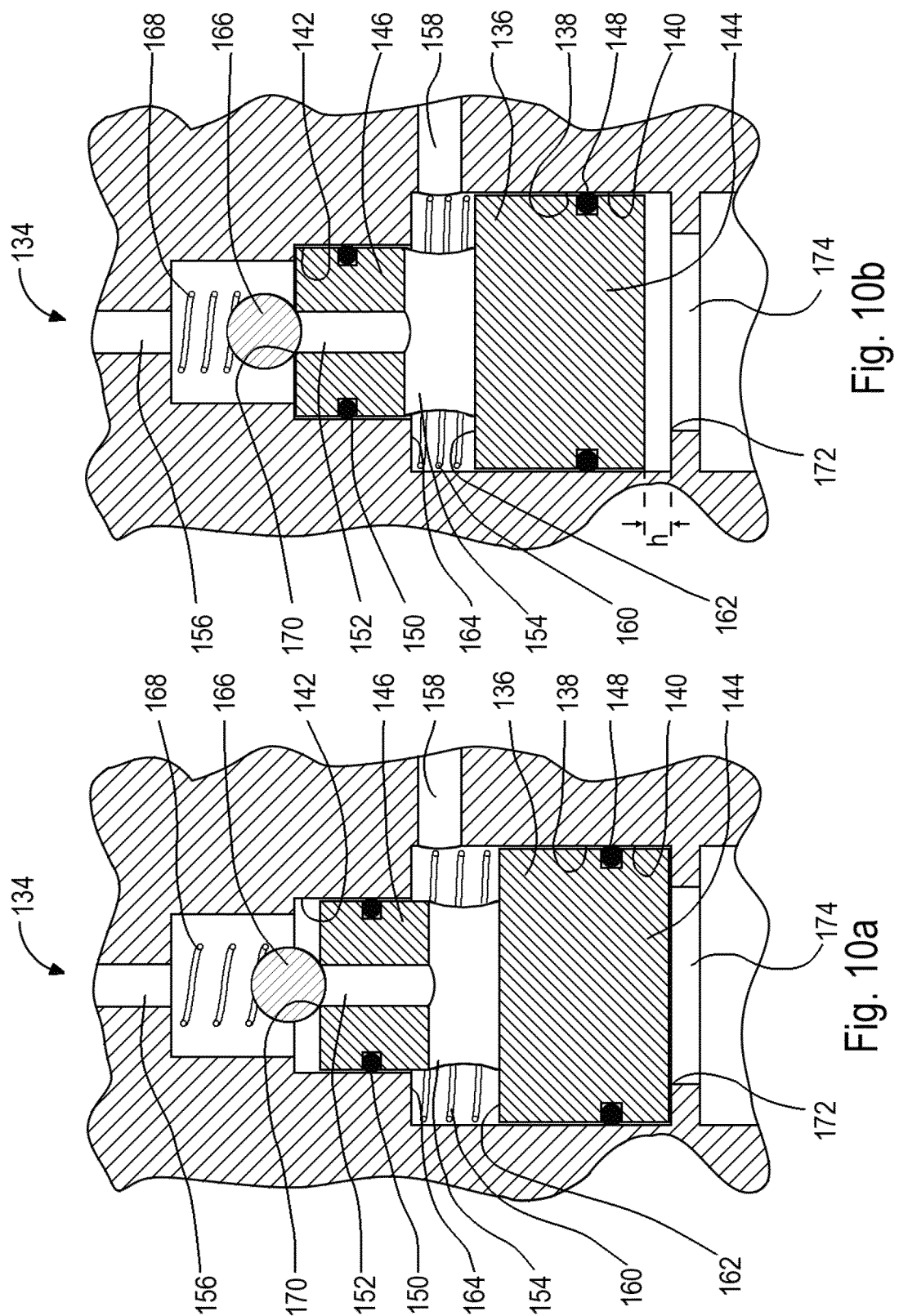

US 8,651,587 B2

ELECTRONICALLY CONTROLLED HYDRAULIC BRAKE SYSTEM

FIELD OF THE INVENTION

The invention relates to an electronically controlled hydraulic brake system capable of active brake interventions, such as those providing traction control or electronic stability control.

BACKGROUND OF THE INVENTION

Hydraulic brake systems for automotive applications typically include a driver-actuated brake pressure generator, such as a booster-aided tandem master cylinder. The pressure generator connects to a reservoir and supplies pressurized brake fluid to a pair of brake circuits. Each brake circuit connects to two wheel brakes.

To provide an anti-lock function with the hydraulic brake system, each wheel brake circuit includes a normally open electronically operated inlet valve. The inlet valve controls the flow of pressurized hydraulic brake fluid to the wheel brake. A pressure relief line includes a normally closed electronically operated outlet valve and leads from each wheel brake to a low-pressure accumulator. The low-pressure accumulator receives brake fluid released during a pressure decrease phase when the outlet valve is opened. A suction line leads from the low-pressure accumulator to a suction side of a motor driven pump.

A pressure side of the pump is connected to a brake line between the inlet valve and the pressure generator. Separating valves are located in respective brake lines of each circuit upstream of the location at which the pressure relief line connects to the brake line. The separating valves isolate the brake lines from the pressure generator during electronically controlled brake operation.

During an active brake intervention event, when the driver has not activated the pressure generator, the pump is provided with the necessary brake fluid from the reservoir. To this end, an additional supply line typically connects the suction side of the pump with the reservoir or with the brake line that connects the pressure generator and the separating valve.

The pump is a self-priming pump that conveys brake fluid without a priming pressure at its suction side. The pump creates a vacuum at its suction side. A pressure retention valve is arranged in the suction line between the low-pressure accumulator and the location where the supply line connects to the suction line. The pressure retention valve prevents the pump from creating a vacuum in the wheel brake cylinders and the low-pressure accumulator. Generating a vacuum in the wheel brakes while braking on ice or other low-friction surfaces would lead to an increased volume of hydraulic brake fluid consumption and accordingly an increased brake pedal travel before the wheel brakes engage. This is an undesirable characteristic in such operating conditions.

The pressure retention valve is typically a check valve that is biased with a spring. The valve requires a pressure difference of approximately 1 bar to open the pressure retention valve and to permit the flow of brake fluid from the low-pressure accumulator to the pump. Due to variances in pressure retention valves, the nominal bias of 1 bar corresponds to an actual bias in the range of approximately 0.7-1.1 bar.

While the vehicle is operating normally on high-friction surfaces, it is desirable that the wheel brake friction elements are retracted to reduce drag and wear. However, the pressure retention valve, while useful in low-friction conditions, prevents the pump from fully retracting the wheel brake friction elements in such operating conditions.

SUMMARY OF THE INVENTION

It is an object of the invention to provide a hydraulic brake system that allows for a retraction of the wheel brake friction elements when the brakes are not in use sufficient to reduce brake drag and excessive wear of the brake friction elements.

It is a further object of the invention to prevent a vacuum in the wheel brakes during electronically controlled brake maneuvers.

It is also an object of the invention to make the improvement compatible with existing packaging of electronically controlled brake systems.

In accordance with the invention, these objectives are met with a pressure retention valve switchable between having a pressure retention bias in one condition and having no pressure retention bias in another condition.

Additional features, benefits, and advantages of the invention will become apparent to those skilled in the art to which the invention relates from the subsequent description of several exemplary embodiments and the appended claims, taken in conjunction with the accompanying drawings.

BRIEF DESCRIPTION OF THE DRAWINGS

Referring to the drawings, wherein like reference numerals are used to designate like components within each of the several views:

FIG. 10a and FIG. 10b are cross-sections of a hydraulically controlled two-position valve suitable for use in the arrangements of FIG. 2 or FIG. 9.

DETAILED DESCRIPTION OF THE DRAWINGS

Figure 1:
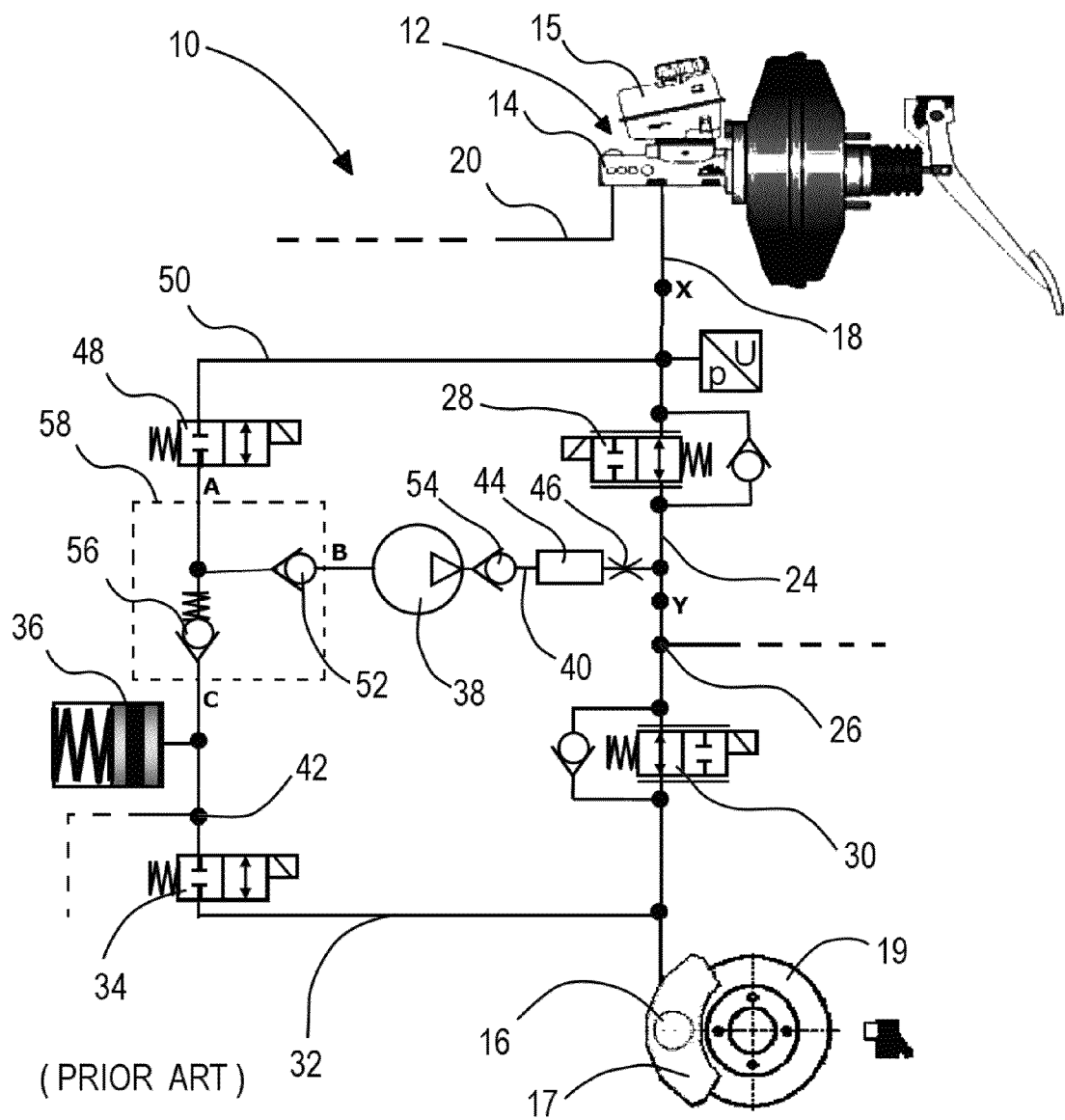
FIG. 1 is a schematic view of an electronically controlled brake system with a prior-art pressure retention valve, in which a dotted line frame indicates a portion of the system to be replaced with cut-outs in accordance with the present invention shown in the subsequent drawings.

Referring to FIG. 1, a hydraulic brake system 10 controls the flow of pressurized brake fluid from a brake pressure generator 12, such as a pedal-operated tandem master cylinder 14 with an attached reservoir 15, four wheel brakes 16, of which only one is shown, via a pair of brake circuits 18 and 20, of which only brake circuit 18 is shown in detail in FIG. 1. The other brake circuit 20 is indicated with a broken line. The two wheel brakes 16 of a brake circuit 18 or 20 may be associated with the same vehicle axle, for example, with one brake circuit 18 operating the wheel brakes of the front axle and the other brake circuit 20 operating the wheel brakes of the rear axle. It is also common to configure the brake circuits 18 and 20 with a diagonal split, in which the front right wheel brake and the rear left wheel brake are controlled by one brake circuit, and the front left wheel brake and the rear right wheel brake by the other. The description given for brake circuit 18 equally applies to brake circuit 20 if the latter is equipped with a self-priming pump 38 (described below). One of wheel brakes 16 is shown in the form of a disc brake type having caliper 17 which clamps friction elements (not shown) against rotor 19.

Brake circuit 18 features a brake line 24 that receives pressurized fluid from the master cylinder 14. Brake line 24 includes a normally open electronically operated separating valve 28 that is controlled by a system controller (not shown). Brake line 24 is also individually connected to wheel brakes 16, and each through a dedicated normally open electronically operated inlet valve 30, also operated by the system controller.

A pressure relief line 32 selectively receives pressurized fluid from each of wheel brakes 16 through an associated normally closed electronically operated outlet valve 34, similarly controlled by the system controller. While only one wheel brake 16 is shown in brake circuit 18, a second wheel brake 16 is connected via an inlet valve to the brake line 24 at location 26, indicated by a broken line. A pressure relief line of the other of wheel brakes 16 also has an outlet valve that controls a connection to pressure relief line 32 at location 42.

The pressure relief line 32 connects to a low-pressure accumulator (LPA) 36. The LPA 36 receives the brake fluid released from the wheel brakes 16. A suction line 37 leads from the LPA 36 to the intake side of a pump 38 which is driven by an electric motor (not shown) and controlled by the system controller. An output side of the pump 38, by way of a pressure line 40, connects to the brake line 24 between separating valve 28 and inlet valve 30. The suction line 37 includes a suction valve 52. The pressure line 40 includes a pressure valve 54. Both the suction valve 52 and the pressure valve 54 are configured as check valves that prevent a flow of brake fluid from the brake line 24 to the intake side of the pump 38. The pressure line 40 additionally features a damping chamber 44 and a throttling orifice 46 to soften pressure pulses stemming from the pump 38.

To build up brake pressure for active brake interventions, the pump 38 draws brake fluid through the master cylinder 14 and conveys it into the brake line 24. To this end, a supply line 50 connects the brake line 24 between master cylinder 14 and separating valve 28 with the suction line 37. A normally closed electronic shuttle valve 48 controls the flow of brake fluid through the supply line 50.

Because the pump 38 must be able to draw hydraulic fluid at atmospheric pressure, it is designed as a self-priming pump capable of generating a vacuum. To ensure that the pump 38 draws its fluid through the master cylinder 14 from the attached reservoir 15 and not from the wheel brakes 16, a pressure retention valve 56 is arranged in the suction line 37 between the LPA 36 and the location where the supply line 50 is connected. The pressure retention valve 56 is a spring-loaded check valve opening in the direction from LPA 36 to the intake side of the pump 38. The spring of the check valve 56 exerts a bias force that requires a pressure difference of approximately 1 bar. Manufacturing variances result in a bias that requires a pressure difference in the range of roughly 0.7 bar to 1.1 bar.

The pressure retention valve 56 ensures that the wheel brake 16 remains highly responsive during sensitive electronic brake control operations, e.g. on low-friction surfaces where the brakes need to be engaged and disengaged in rapid succession. Under such conditions, a vacuum would decrease the brakes' responsiveness and slow down the effective control of the vehicle because a larger volume of brake fluid would be needed to bring the brakes 16 into frictional engagement again during repeated actuation.

For regular driving conditions, however, it is more desirable to retract the friction elements of brakes 16 to a position where brake drag is reduced in order to prevent premature wear of the brake friction elements as well as to improve the vehicle's fuel efficiency. So when an electronic brake control is completed, the pump 38 could be used to create such a vacuum to retract the friction elements of wheel brakes 16. But in the prior-art brake system according to FIG. 1, the pressure retention valve 56 prevents the creation of a vacuum in the low-pressure accumulator 36 and in the wheel brakes 16.

The present invention provides brake circuit components which are controllable to permit a vacuum in the wheel brake 16 to reduce drag in certain operating conditions while preventing a vacuum in the wheel brakes 16 in conditions when slip control is required. These features can be established in several different ways. According to the present invention, the arrangements of the following examples of FIGS. 2-9 replace the cut-out portion 58 of FIG. 1. The letters A, B, and C mark hydraulic connection points corresponding with points of the system shown in FIG. 1, which are marked with the same letters. Each of the valves of FIGS. 2-9 is depicted in its normal position, i.e. in the position the valve assumes absent any external forces from an actuator, which may be as examples, hydraulically or electrically controlled.

In the description of the valves shown in FIGS. 2-10$b$, reference is made to their moving between two positions, a "normal" and an "activated" position, these positions correspond to functional conditions of the valves. One condition maintains a positive pressure in the suction line, and the other condition does not, thereby allowing a vacuum to be created.

Figure 2:
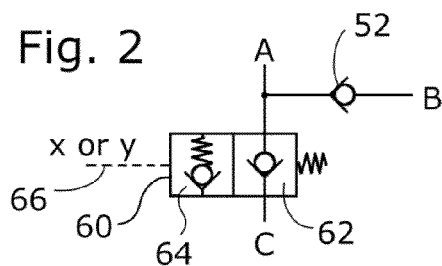
FIG. 2 is a schematic view of a first exemplary pressure retention valve arrangement, where the pressure retention bias is enabled by hydraulic pressure in the brake line.

A first embodiment according to FIG. 2 features a hydraulically controlled two-position valve 60. In its normal position as shown, valve 60 acts as a regular check valve with an opening pressure of 0 bar, i.e. without bias, allowing a unidirectional flow of brake fluid from the LPA 36 to the intake side of the pump 38. The check valve element is designated by reference number 62. In its activated position, shifted to the right, the hydraulically controlled two-position valve 60 enables the pressure retention bias of approximately 1 bar since the biased check valve element 64 is brought into position between connection points A and C. The valve 60 is shifted between positions by a hydraulic cylinder actuator designated by dotted lines 66. As described below, other actuator types can be used.

The hydraulic control pressure switching the two-position valve 60 from its normal position to its activated position can be the pressure at location X applied to actuator 66 (shown in FIG. 1 between master cylinder 14 and separating valve 28) or at location Y (shown in FIG. 1 (between separating valve 28 and inlet valve 30) in brake line 24. The difference between the two locations is that location X will only be pressurized when the master cylinder 14 is operated. Location Y is pressurized during any driver-initiated or automatic brake operation, regardless of the master cylinder 14 pressure. Accordingly, the pressure at location Y has a more universal functionality and will effectively prevent a delayed brake engagement in highly dynamic situations requiring an active brake intervention, even if the driver may not have had enough time to apply the brake pedal. These considerations regarding the pressure that controls the hydraulically controlled valve 60 via actuator 66 also apply to all other subsequent embodiments with hydraulically controlled valves.

Figure 3:
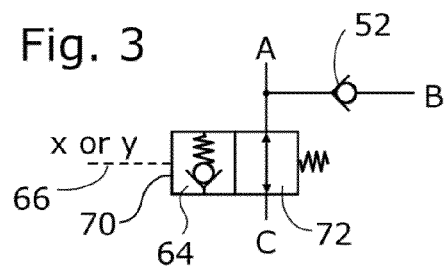
FIG. 3 is a schematic view of a second exemplary pressure retention valve arrangement, where the pressure retention bias is enabled by hydraulic pressure in the brake line.

The embodiment of FIG. 3 differs from the one of FIG. 2 in that valve 70, in its normal position as shown, allows a bidirectional flow of brake fluid since element 72 is an unrestricted flow passageway. When brake pressure prevails in the brake line 24 at location X or Y, valve 70 is activated and shifted to the right, bringing biased check valve 64 into position which provides a pressure retention bias. When the brake line 24 returns to atmospheric pressure, valve 70 allows a free bidirectional flow of brake fluid and enables the pump 38 to generate a vacuum in the wheel brakes 16 to retract the brake friction elements. After the brake friction elements of wheel brakes 16 have been retracted and after the pump 38 has been turned off, valve 70 allows the pressure in the wheel brakes 16 to be restored to atmospheric pressure.

Figure 4:
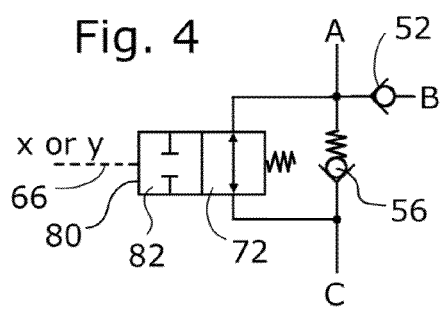
FIG. 4 is a schematic view of a third exemplary pressure retention valve arrangement, where the pressure retention bias is enabled by hydraulic pressure in the brake line.

In FIG. 4, a hydraulically controlled two-position valve 80 is arranged in a parallel constellation with the pressure retention valve 56. Valve 80 is controlled by the prevailing pressure at location X or Y in brake line 24. In its normal position as shown with element 72 in position, the valve 80 allows a bidirectional flow bypassing the pressure retention valve 56. In its activated position when the valve 80 is shifted to the right hand position, blocking plug 82 is in a position which shuts off the bypass and only allows fluid to pass through the pressure retention valve 56. Accordingly, the functionality of this arrangement is similar to that of FIG. 3.

Figure 5:
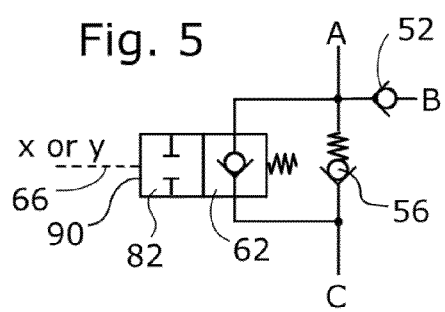
FIG. 5 is a schematic view of a fourth exemplary pressure retention valve arrangement, where the pressure retention bias is enabled by hydraulic pressure in the brake line.

The arrangement of FIG. 5 replaces the bidirectional bypass of FIG. 4 with a unidirectional bypass with a check valve 62 (without bias) in the depicted normal position of valve 90, thereby obtaining essentially the same functionality as the arrangement of FIG. 2. Activating valve 90 brings blocking plug 82 into position.

All hydraulically controlled valves described above can be replaced with electronically controlled valves. Instead of a hydraulic connection to location X or Y applied to actuator 66, each of the valves of FIGS. 2-5 can feature an electrical solenoid 102 and can be switched from their shown normal position to their activated position (i.e. between conditions) by an electric current applied to the solenoid. Additionally, electronically controlled valves offer the flexibility that the normal position and the activated position of the valves can be interchanged because such valves do not depend on hydraulic pressure to switch from their normal position to their activated position, but rather on an electric current initiated by the system controller.

Figure 6:
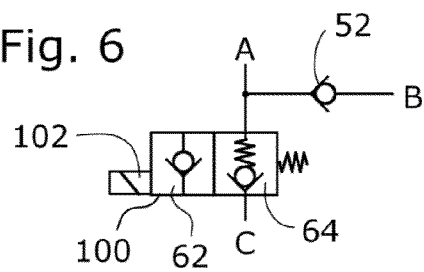
FIG. 6 is a schematic view of a fifth exemplary pressure retention valve arrangement, where the pressure retention bias is electronically controlled.

In FIG. 6, the hydraulically controlled valve 60 of FIG. 2 has been replaced with an electronically controlled valve 100 with the electrical actuator 102. Because valve 100 depends on a signal from the system controller (not shown) the pressure retention bias can be active in the normal position of electronically controlled valve 100 as shown where biased check valve 64 is operative. An unbiased check valve 62 is active in the activated position of valve 100.

Figure 7:
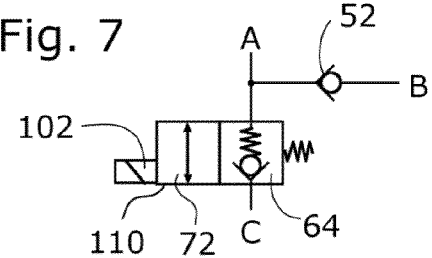
FIG. 7 is a schematic view of a sixth exemplary pressure retention valve arrangement, where the pressure retention bias is electronically controlled.

An electronically controlled valve 110 of FIG. 7 offers the same positions as the valve 70 of FIG. 3, but the normal and activated positions are interchanged. The pressure retention valve is effective in the normal position of the two-position valve 110 as shown where biased check valve 64 is operative. In the activated position of valve 110, an unrestricted bidirectional flow of brake fluid is enabled by element 72, allowing the pump 38 to generate a vacuum in the wheel brakes 16 to retract the brake friction elements. After the brake friction elements of wheel brakes 16 have been retracted and after the pump 38 has been turned off, valve 70 allows the pressure in the wheel brakes 16 to be restored to atmospheric pressure.

Figure 8:
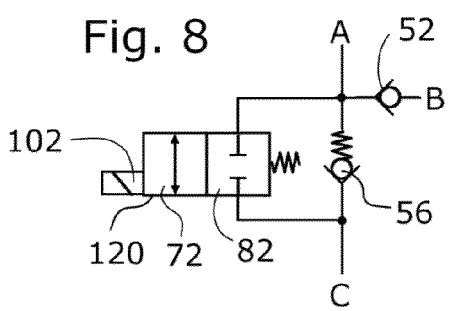
FIG. 8 is a schematic view of a seventh exemplary pressure retention valve arrangement, where the pressure retention bias is electronically controlled.

FIG. 8 shows an electronically controlled version of the arrangement of FIG. 4 with a two-position valve 120 arranged in a bidirectional bypass around the pressure retention valve 56. In the normal position of the two-position valve 120 blocking plug 82 is active, and the activated position opens the bypass through element 72.

Figure 9:
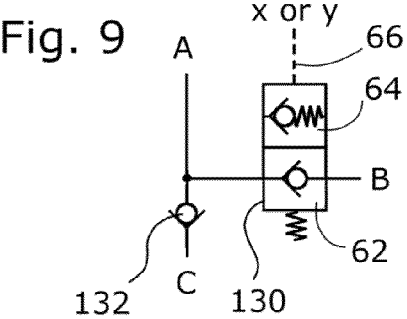
FIG. 9 is a schematic view of a cut-out in which the return pump's suction valve has a variable bias.

In FIG. 9, a two-position valve 130 is arranged not in the location of the pressure retention valve 56 described above, but in the location of the suction valve 52 of the pump 38. The pressure retention valve 56 is replaced with an unbiased check valve 132 allowing a flow from the LPA 36 to the pump 38 whenever the hydraulic pressure in the LPA 36 is greater than the hydraulic pressure at the intake side of the pump 38. The two-position valve 130 is activated by pressure in position X or position Y of the brake line 24 to switch from an unbiased check valve element 62 to a spring-loaded biased check valve element 64 requiring a pressure difference typical for a pressure retention valve. In this arrangement, the pressure in the wheel brakes 16 and in the LPA 36 can return to atmospheric pressure whenever the master cylinder 14 is not pressurized. Opening the shuttle valve 48, regardless of the position of the two-position valve 130, releases the brake fluid from the pressure relief line 32 to the brake line 24 above the separating valve 28. The hydraulic control of the two-position valve 130 can be replaced with an electronic control, in which case the normal position and activated position can be interchanged.

FIG. 10a and FIG. 10b give an example for a hydraulically controlled two-position valve 134 suitable for use in the arrangements of FIG. 2 or FIG. 9. FIG. 10a shows the valve 134 in its normal position, where as FIG. 10b shows it in its activated position. A stepped valve piston 136 is slidably arranged in a stepped valve bore 138. A wider section 140 of a valve bore 138 is sealed off with a wider section 144 of the piston 136, which carries an annular seal 148. A narrower section 146 of the piston 136 protrudes into a narrower section 142 of the bore 138 and carries an annular seal 150. Annular seal 150 seals off the perimeter of the narrower piston section 146 preventing flow between the upper and lower sections of bore 138.

The narrower piston section 146 features an axial channel 152 that terminates in a radial channel 154. Radial channel 154 extends through the narrower piston section 146 between the annular seal 150 and the wider piston portion 144.

The narrower section 142 has an axial port 156 that connects to the intake side of the pump 38. The wider bore section 140 features a radial port 158 close to the bore step 164 in an axial area that overlaps with the axial location of the radial channel 154.

A piston spring 160 is arranged in the space between the piston step and the bore step, urging the valve piston 136 away from the narrower bore section 142.

Between the axial channel 152 and the axial port 156, a valve closure member 166 and a valve spring 168 are arranged to control the hydraulic connection between the axial channel 152 and the axial port 156. In the shown embodiment, the axial opening of the axial channel 152 in the axial end of the narrower piston section forms a valve seat 170 cooperating with the valve closure member 166.

The axial port 156 is connected to the intake side of the pump 38 and the supply line with the shuttle valve, while the radial port leads to the LPA 36. The hydraulic pressure prevailing in the brake line 24 either at location X or at location Y of FIG. 1 acts on the end of the wider piston section 144 in space 174.

When the respective brake line location X or Y is unpressurized, the valve piston 136 is in its normal position as shown in FIG. 10a, where piston 136 rests against an abutment ridge 172 in the wider section 140 of the bore 138. This ridge 172 can, for instance, be formed by a snap ring or the like.

The valve closure member 166 rests on the valve seat 170 as long as the pressure prevailing at the suction side of the pump 38, i.e. at the axial port 156, is equal to or greater than the hydraulic pressure in the LPA 36, i.e. at the radial port 158. The spring 168 is relaxed and does not preload the valve closure member 166; it only holds the valve closure member 166 in place. As soon as the pressure in the axial port 156 decreases below the pressure in the radial port 158, the valve member 166 is displaced, thereby opening a fluid path from the radial port 158 through the radial and axial channels 152 and 154, and through the valve seat 170 to the axial port 156.

If, however, the pressure acting in space 174 acting on the wider piston section 144 overcomes the force of the piston spring 160 and of the valve spring 168, the valve spring 168 is compressed by a length equal to the piston stroke h. The valve spring 168 is now preloaded with the pressure retention bias. The valve spring 168 is designed to provide a bias that would allow the valve closure member 166 to lift off the valve seat 170 if the pressure at the radial port 158 is higher than at the axial 156 port by approximately 1 bar.

The hydraulic lines connected to the axial and radial ports 156 and 158 can be swapped if the valve closure member 166 has its seat on the axial port 156 and if the valve spring 168 abuts the end of the smaller piston section. Also, the seals 148 and 150 shown here as simple O-rings can be designed as lip seals or with any other cross-section.

The various embodiments shown are only examples for implementing the invention. It is, for instance, possible to integrate the pressure retention valve in the shuttle valve, in the suction valve, or in other additional valves not shown here. Because the possibilities are endless, the invention should not be viewed to be limited to the specific embodiments

What is claimed is:

1. An electronically controlled hydraulic brake system comprising:
   a driver-operated pressure generator displacing brake fluid into a brake circuit,
   a wheel brake,
   a brake line connecting the pressure generator to the wheel brake,
   a low-pressure accumulator,
   a relief line from the wheel brake to the low-pressure accumulator,
   a self-priming pump with a suction side and a pressure side,
   a suction line from the low-pressure accumulator to the suction side,
   a pressure retention valve assembly in the suction line,
   a pressure line from the pressure side of the pump to a junction with the brake line between the pressure generator and the wheel brake,
   a supply line from the brake line from the pressure generator to the suction line, and
   wherein the pressure retention valve assembly is actuatable to two conditions, a first condition which allows a flow of brake fluid from the low-pressure accumulator to the suction side of the pump and has a pressure retention bias requiring a pressure difference of at least 0.5 bar to allow the flow of brake fluid, and a second condition which disables the pressure retention bias
   wherein the pressure retention valve assembly comprises a two-position valve having a normal position and an activated position, the normal position corresponding to one of the conditions and the activated position corresponding to the other of the conditions; and
   wherein one of the two positions of the two-position valve assembly allows a bidirectional flow of brake fluid through the suction line in the second condition.

2. The brake system of claim 1, wherein the second condition enables a bias below 0.5 bar.

3. The brake system of claim 1, wherein the pressure retention valve assembly moves to the second condition when the pressure generated by the pressure generator equals atmospheric pressure.

4. The brake system of claim 1, wherein the pressure retention valve assembly moves to the second condition when the pressure in the brake line between a separating valve and a inlet valve equals atmospheric pressure.

5. The brake system of claim 1, wherein the two-position valve is hydraulically controlled to move between the positions.

6. The brake system of claim 1, wherein the pressure retention valve assembly comprises a pressure retention valve with a bypass around the pressure retention valve, wherein the two-position valve opens and closes the bypass by moving between the positions.

7. The brake system of claim 6, wherein the bypass allows bidirectional flow of brake fluid in the second condition.

8. The brake system of claim 1, wherein the normal position corresponds with the first condition and enables the pressure retention bias.

9. The brake system of claim 1, wherein the normal position corresponds with the second condition and disables the pressure retention bias.

10. An electronically controlled hydraulic brake system comprising:
    a driver-operated pressure generator displacing brake fluid into a brake circuit;
    a wheel brake;
    a brake line connecting the pressure generator to the wheel brake;
    a low-pressure accumulator;
    a relief line from the wheel brake to the low-pressure accumulator;
    a self-priming pump with a suction side and a pressure side;
    a suction line from the low-pressure accumulator to the suction side;
    a pressure retention valve assembly in the suction line;
    a pressure line from the pressure side of the pump to a junction with the brake line between the pressure generator and the wheel brake;
    a supply line from the brake line from the pressure generator to the suction line;
    wherein the pressure retention valve assembly is actuatable to two conditions, a first condition which allows a flow of brake fluid from the low-pressure accumulator to the suction side of the pump and has a pressure retention bias requiring a pressure difference of at least 0.5 bar to allow the flow of brake fluid, and a second condition which disables the pressure retention bias;
    wherein the pressure retention valve assembly comprises a two-position valve having a normal position and an activated position, the normal position corresponding to one of the conditions and the activated position corresponding to the other of the conditions; and wherein the pressure retention valve assembly comprises a pressure retention valve with a bypass around the pressure retention valve, wherein the two-position valve opens and closes the bypass by moving between the positions.

11. The brake system of claim 10, wherein the second condition enables a bias below 0.5 bar.

12. The brake system of claim 10, wherein the pressure retention valve assembly moves to the second condition when the pressure generated by the pressure generator equals atmospheric pressure.

13. The brake system of claim 10, wherein the pressure retention valve assembly moves to the second condition when the pressure in the brake line between a separating valve and a inlet valve equals atmospheric pressure.

14. The brake system of claim 10, wherein the two-position valve is hydraulically controlled to move between the positions.

15. The brake system of claim 10, wherein the bypass allows bidirectional flow of brake fluid in the second condition.

16. The brake system of claim 10, wherein the normal position corresponds with the first condition and enables the pressure retention bias.

17. The brake system of claim 10, wherein the normal position corresponds with the second condition and disables the pressure retention bias.

\* \* \* \* \*